US008588111B1

(12) United States Patent
Kridlo

(10) Patent No.: US 8,588,111 B1
(45) Date of Patent: Nov. 19, 2013

(54) SYSTEM AND METHOD FOR PASSIVE COMMUNICATION RECORDING

(75) Inventor: Michal Kridlo, Kolin (CZ)

(73) Assignee: Zoom International s.r.o., Prague (CZ)

( * ) Notice: Subject to any disclaimer, the term of this patent is extended or adjusted under 35 U.S.C. 154(b) by 0 days.

(21) Appl. No.: 13/620,715

(22) Filed: Sep. 15, 2012

(51) Int. Cl.
*H04L 12/54* (2013.01)

(52) U.S. Cl.
USPC ........................................................ 370/259

(58) Field of Classification Search
USPC ............... 700/32; 725/87; 726/1; 455/414.1; 370/401; 709/204
See application file for complete search history.

(56) References Cited

U.S. PATENT DOCUMENTS

| | | | |
|---|---|---|---|
| 7,633,930 B2 | 12/2009 | Spohrer et al. | |
| 7,676,025 B2 | 3/2010 | Lautenschlager et al. | |
| 7,996,549 B2 * | 8/2011 | Ryman | 709/231 |
| 2002/0147509 A1 * | 10/2002 | Sameshima et al. | 700/32 |
| 2007/0124779 A1 * | 5/2007 | Casey et al. | 725/87 |
| 2007/0230486 A1 * | 10/2007 | Zafirov | 370/401 |
| 2010/0043052 A1 * | 2/2010 | Park et al. | 726/1 |
| 2010/0173618 A1 * | 7/2010 | Kass et al. | 455/414.1 |
| 2012/0089677 A1 * | 4/2012 | Shafran et al. | 709/204 |

FOREIGN PATENT DOCUMENTS

JP 2010117934 A * 5/2010

* cited by examiner

*Primary Examiner* — Asad Nawaz
*Assistant Examiner* — Parth Patel
(74) *Attorney, Agent, or Firm* — Galvin Patent Law LLC; Brian R. Galvin

(57) ABSTRACT

A system for passive communication recording, comprising a plurality of record servers and a recording management server. Upon receiving a recording request for a specific communication, the recording management server extracts identification information, generates recording rules, and sends target information and recording rules to a record server capable of intercepting packets arriving at or sent from the target. The record server creates a hashtable entry for the target and associates the hashtable entry with the recording rules. On detecting a new data packet, the packet sniffer passes the new packet to a cyclic buffer. A recorder software module pulls a second data packet from the cyclic buffer, determines if a hashtable entry exists that corresponds to the second data packet, and if a corresponding hashtable entry exists and any recording rules associated with the corresponding hashtable entry are satisfied, sends the second data packet to the local packet storage.

8 Claims, 10 Drawing Sheets

SYSTEM AND METHOD FOR PASSIVE COMMUNICATION RECORDING

CROSS-REFERENCE TO RELATED APPLICATIONS

None.

BACKGROUND OF THE INVENTION

1. Field of the Invention

The invention relates to the field of telecommunications applications, and more particularly to the field of call recording applications for use in contact centers and law enforcement.

2. Discussion of the State of the Art

Recording communications is a very important part of contact center operations and of law enforcement, for obviously different reasons. Moreover, communication monitoring, for example where a quality assurance monitors telephone calls in a contact center to ensure quality of customer service, is also common and uses much the same technical approach as that used in communication recording. In both contact center and law enforcement usage, it is often desirable for at least one of the parties in a communication to have his communication recorded or monitored without his knowledge (or indeed often without his consent). In the art, this condition is often satisfied in cases where communications are delivered using "plain old telephone service" (POTS) in which dedicated circuits used for calls are easily monitored using a variety of tapping devices (hence the term "wiretapping"), the monitoring being undetectable by the persons being monitored or recorded.

In the case of more modern, packet-based communications channels (for example, internet protocol telephony), it is often much more difficult to record or monitor communication between one or more parties without the knowledge of the parties involved, particularly if the parties are technically knowledgeable about data networks. Moreover, in many cases it is difficult to arrange for packet-based telephony call monitoring in the same manner as is used by circuit-based (POTS) systems, as it is often impossible to know in advance exactly what data path will be followed by packets corresponding to any given call. In some cases this is facilitated by so-called "SIP trunking", which uses an architecture very similar to POTS, with each SIP call going through one of a plurality of circuit-like SIP trunks, but this is not always the approach taken in delivering IP telephony calls to contact centers, and it is also rarely the case that calls to be monitored or recorded by law enforcement agencies will be easily tapped using SIP trunks.

What is needed in the art is a method for passively monitoring or recording IP communications in a way that is undetectable by one or more of the parties being monitored.

SUMMARY OF THE INVENTION

Accordingly, the inventor has conceived and reduced to practice, in a preferred embodiment of the invention, a system and various methods for passively recording or monitoring communications carried by IP telephone means.

According to a preferred embodiment of the invention, a system for passive communication recording is disclosed, comprising a plurality of record servers each operating on a network-attached computer and comprising a packet sniffer, a cyclic buffer, a recorder software module, and a local packet storage, and a recording management server operating on a network-attached computer and comprising a plurality of recording rules stored in memory and a core server software module. Upon receiving a recording request for a specific communication, the recording management server extracts identification information pertaining to at least a target of the recording request, generates a plurality of recording rules based at least on the recording request, and sends target information and the plurality of recording rules to a first record server capable of intercepting packets arriving at or sent from the target. The first record server, upon receiving target information and the plurality of recording rules, creates a hashtable entry for the target and associates the hashtable entry with the plurality of recording rules. On detecting a new data packet from a network-attached packet source, the packet sniffer passes the new packet to the cyclic buffer, and the recorder software module pulls a second data packet from the cyclic buffer, identifies one or more of a source and a destination of the second packet, determines if a hashtable entry exists that corresponds to the second data packet based on the source, the destination, or both, and if a corresponding hashtable entry exists and any recording rules associated with the corresponding hashtable entry are satisfied, the recorder software module sends the second data packet to the local packet storage.

According to another embodiment of the invention, the system further comprises a monitoring station coupled via a data network to at least one record server; when the recorder software module sends the second data packet to the local packet storage, if a specific recording rule requires live monitoring of a communication or target associated with the second data packet, the second data packet is also sent via a real-time part interface to a monitoring station.

According to another embodiment of the invention, the system further comprises an automated speech recognition server coupled to a record server, wherein a first rule is applied by the automated speech recognition server to determine whether a specific communication should be recorded. In a further embodiment, the first rule uses either a word spotting function or a mood detection function, or both.

According to another preferred embodiment of the invention, a method for passive communication recording, the method comprising the steps of: (a) receiving, at a recording management server operating on a network-attached computer, a recording request for a specific communication; (b) extracting identification information pertaining to at least a target of the recording request; (c) generating a plurality of recording rules based at least on the recording request; (d) sending target information and the plurality of recording rules to a first record server capable of intercepting packets arriving at or sent from the target and operating on a network-attached computer and comprising a packet sniffer, a cyclic buffer, a recorder software module, and a local packet storage; (e) creating, at the first record server, a hashtable entry for the target; (f) associating the hashtable entry with the plurality of recording rules; (g) detecting, at the packet sniffer, a new data packet from a network-attached packet source; (h) passing the new packet from the packet sniffer to the cyclic buffer; (i) pulling, using the recorder software module, a second data packet from the cyclic buffer; (j) determining if a hashtable entry exists that corresponds to the second data packet based on the source, the destination, or both; and (k) if a corresponding hashtable entry exists and any recording rules associated with the corresponding hashtable entry are satisfied, sending, using the recorder software module, the second data packet to the local packet storage.

According to another embodiment of the invention, the method further comprises the step of (l) sending the second data packet via a real-time part interface to a monitoring station coupled via a data network to at least one record server, if a specific recording rule requires live monitoring of a communication or target associated with the second data packet. According to a further embodiment of the invention, a first rule is applied by an automated speech recognition server coupled to a record server to determine whether a specific communication should be recorded; in yet a further embodiment, the first rule uses either a word spotting function or a mood detection function, or both.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
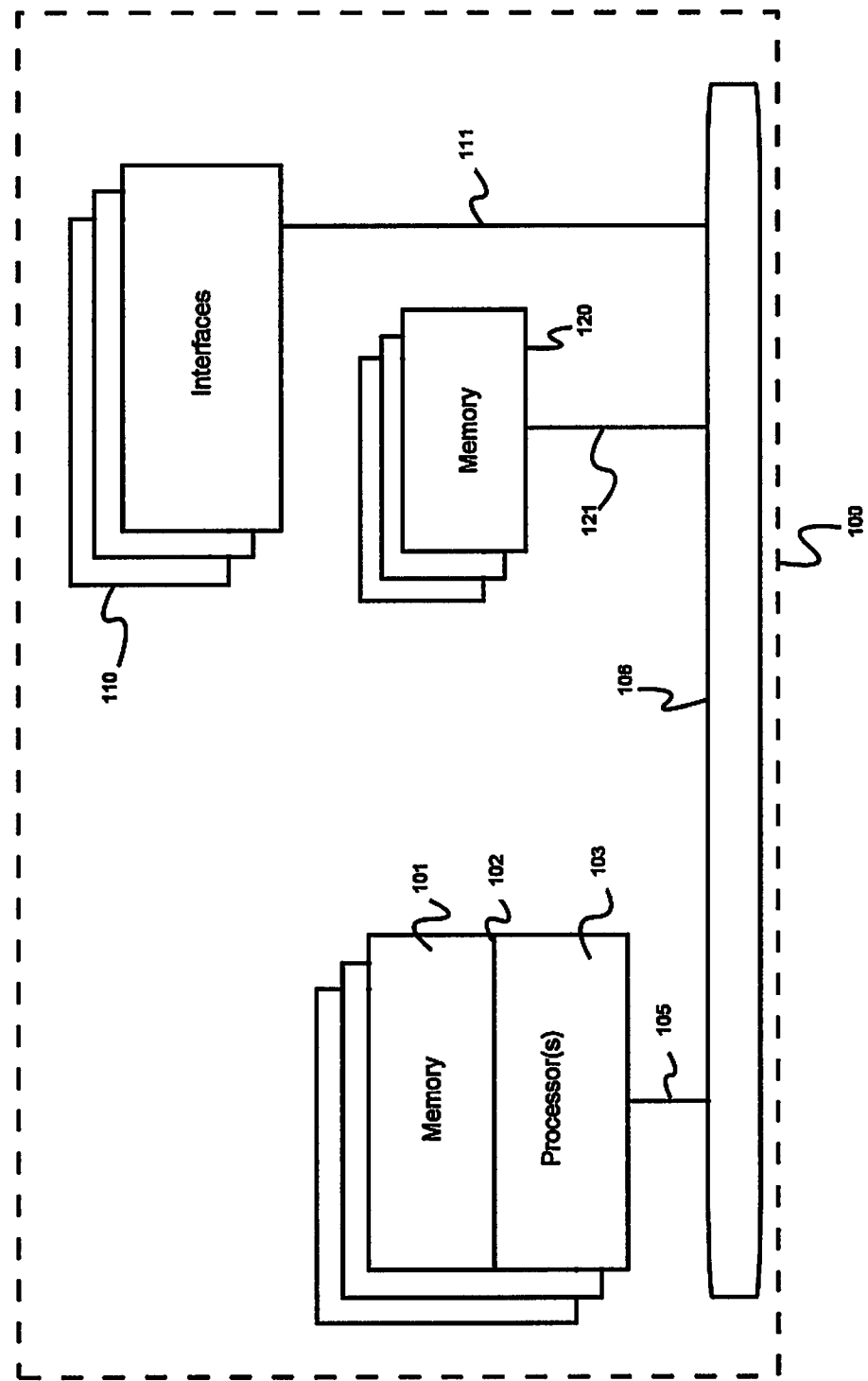
FIG. 1 is a block diagram illustrating an exemplary hardware architecture of a computing device used in an embodiment of the invention.

The inventor has conceived, and reduced to practice, a system and various methods for passive recording communications that address the shortcomings of the prior art that were discussed in the background section.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Furthermore, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity.

However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of the embodiments of the present invention in which for example functions may be executed out of order from that shown or discussed, including substantially concurrently or in reverse order, depending on the functionality involved, as would be understood by those having ordinary skill in the art.

DEFINITIONS

A "communication" is defined as a discourse between one or more parties, which may be any of individuals, end points, or systems, the discourse conducts using various means including, but not limited to, plain old telephone service (POTS), Voice over IP (VoIP), video conferencing, Instant Messaging (IM), or availability presence information.

"UCM" is defined as a Unified Communication Module that handles the integration of various real-time communication services such as VoIP, instant messaging (IM), availability presence information, video conferencing, data sharing with non-real-time communication services such as voicemail, e-mail, SMS and fax.

A "recording target" is a party, that is, a person, location, endpoint or other entity, capable of initiating or receiving communications with another entity, and whose communications may be recorded by one or more systems according to the invention.

An "additional recording target" is a recording target added during execution of the system.

A "communication environment" is an technical environment, whether public or private, that facilitates communication between two entities.

Hardware Architecture

Generally, the techniques disclosed herein may be implemented on hardware or a combination of software and hardware. For example, they may be implemented in an operating system kernel, in a separate user process, in a library package bound into one or more network applications, on a specially constructed machine, or on a network interface card. In a specific embodiment, the techniques disclosed herein may be implemented in software such as an operating system or in an application running on an operating system.

Software/hardware hybrid implementation(s) of at least some of the embodiment(s) disclosed herein may be implemented on a programmable machine selectively activated or reconfigured by a computer program stored in memory. Such network devices may have multiple network interfaces that may be configured or designed to utilize different types of network communication protocols. A general architecture for some of these machines may appear from the descriptions disclosed herein. According to specific embodiments, at least some of the features and/or functionalities of the various embodiments disclosed herein may be implemented on one or more general-purpose network host machines such as an end-user computer system, computer, network server or server system, mobile computing device (e.g., tablet computing device, mobile phone, smartphone, laptop, and the like), consumer electronic device, music player, or any other suitable electronic device, router, switch, or the like, or any combination thereof. In at least some embodiments, at least some of the features and/or functionalities of the various embodiments disclosed herein may be implemented in one or more virtualized computing environments (e.g., network computing clouds, or the like).

Referring now to FIG. 1, there is shown a block diagram depicting a computing device 100 suitable for implementing at least a portion of the features and/or functionalities disclosed herein. Computing device 100 may be, for example, an end-user computer system, network server or server system, mobile computing device (e.g., mobile phone, smartphone, laptop, tablet computer, or the like), consumer electronic device, music player, or any other suitable electronic device, or any combination or portion thereof. Computing device 100 may be adapted to communicate with other computing devices, such as clients and/or servers, over a communications network such as the Internet, using known protocols for such communication, whether wireless or wired.

In one embodiment, computing device 100 includes central processing unit (CPU) 102, interfaces 110, and a bus 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a call recording system utilizing CPU 102, memory 101, 120, and interface(s) 110. In at least one embodiment, CPU 102 may be caused to perform one or more of the different types of functions and/or operations under the control of software modules/components, which for example, may include an operating system and any appropriate applications software, drivers, and the like.

CPU 102 may include one or more processor(s) 103 such as, for example, a processor from one of the Intel, ARM, Qualcomm, and AMD families of microprocessors. In some embodiments, processor(s) 103 may include specially designed hardware (e.g., application-specific integrated circuits (ASICs), electrically erasable programmable read-only memories (EEPROMs), field-programmable gate arrays (FPGAs), and the like) for controlling operations of computing device 100. In a specific embodiment, a memory 101 (such as non-volatile random access memory (RAM) and/or read-only memory (ROM)) also forms part of CPU 102. However, there are many different ways in which memory may be coupled to the system. Memory block 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as interface cards (sometimes referred to as "line cards"). Generally, they control the sending and receiving of data packets over a computing network and sometimes support other peripherals used with computing device 100. Among the interfaces that may be provided are Ethernet interfaces, frame relay interfaces, cable interfaces, DSL interfaces, token ring interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing the techniques of the invention(s) described herein, it is by no means the only device architecture on which at least a portion of the features and techniques described herein may be implemented. For example, architectures having one or any number of processors 103 can be used, and such processors 103 can be present in a single device or distributed among any number of devices. In one embodiment, a single processor 103 handles communications as well as routing computations. In various embodiments, different types of features and/or functionalities may be implemented in a system according to the invention that includes a client device (such as a tablet device or smartphone running client software) and server system(s) (such as a server system described in more detail below).

Regardless of network device configuration, the system of the present invention may employ one or more memories or memory modules (such as, for example, memory block 120) configured to store data, program instructions for the general-purpose network operations and/or other information relating to the functionality of the embodiments described herein. The program instructions may control the operation of an operating system and/or one or more applications, for example. The memory or memories may also be configured to store configuration data, call or other media recordings, event data pertaining to recorded calls, user action information, and/or other specific non-program information described herein.

Because such information and program instructions may be employed to implement the systems/methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both machine code, such as produced by a compiler, and files containing higher level code that may be executed by the computer using an interpreter.

Figure 2:
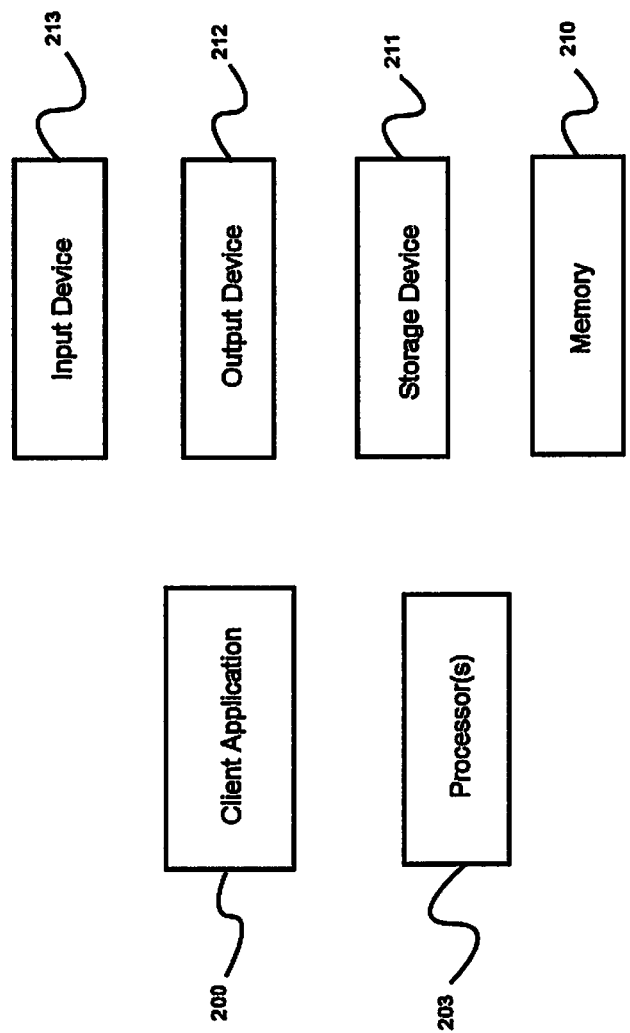
FIG. 2 is a block diagram illustrating an exemplary logical architecture for a client device, according to an embodiment of the invention.

In some embodiment, systems used according to the present invention may be implemented on a standalone computing system. Referring now to FIG. 2, there is shown a block diagram depicting an architecture for implementing one or more embodiments or components thereof on a standalone computing system. Computing device 100 includes processor(s) 103 that run software for implementing for example a recording management or other client application 200. Input device 212 can be of any type suitable for receiving user input, including for example a keyboard, touchscreen, microphone (for example, for voice input), mouse, touchpad, trackball, five-way switch, joy stick, and/or any combination thereof. Output device 1711 can be a screen, speaker, printer, and/or any combination thereof. Memory 210 can be random-access memory having a structure and architecture as are known in the art, for use by processor(s) 103 for example to run software. Storage device 211 can be any magnetic, optical, and/or electrical storage device for storage of data in digital form; examples include flash memory, magnetic hard drive, CD-ROM, and/or the like.

Figure 3:
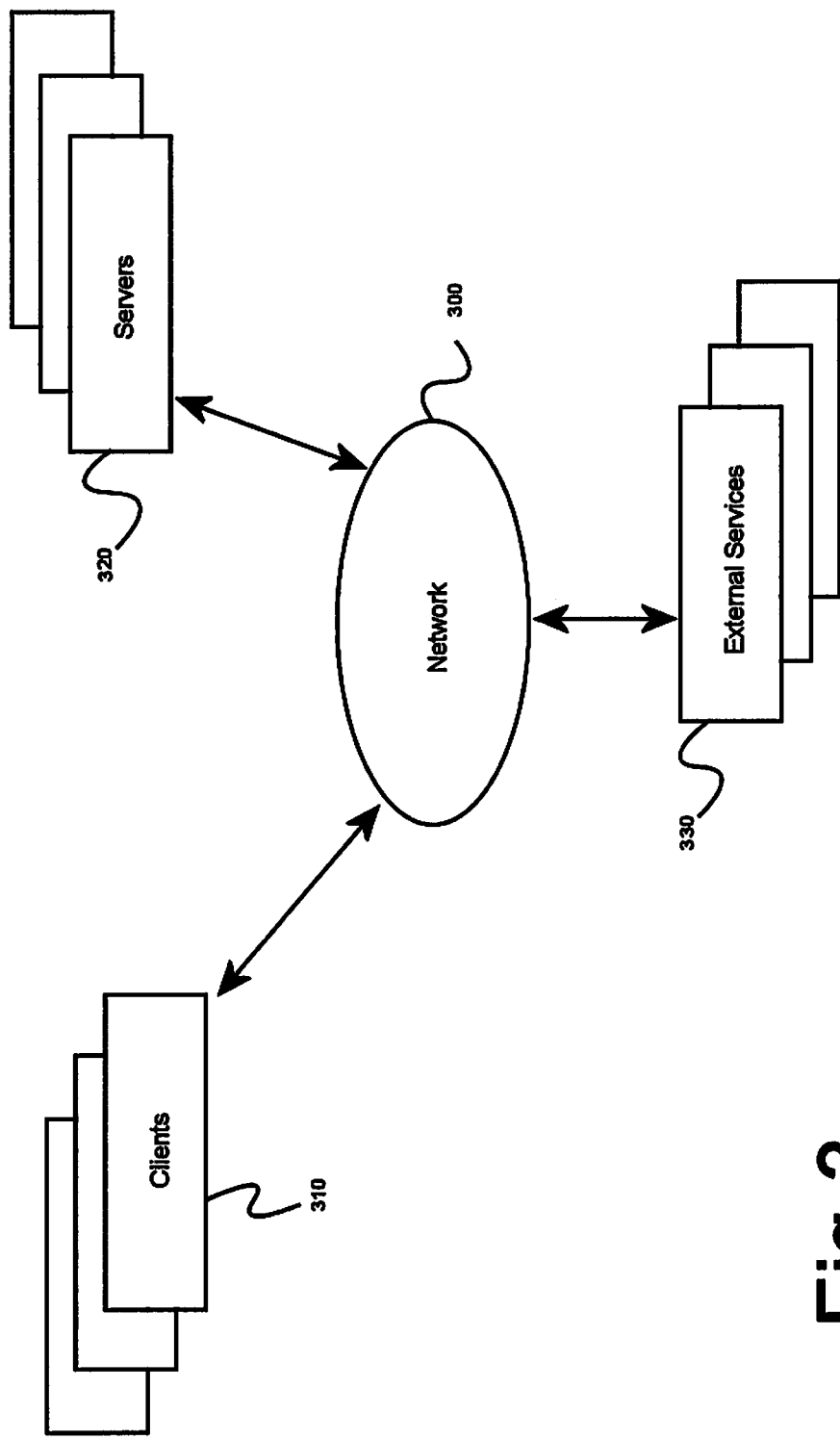
FIG. 3 is a block diagram showing an exemplary architectural arrangement of clients, servers, and external services, according to an embodiment of the invention.

In some embodiments, the system of the present invention is implemented on a distributed computing network, such as one having any number of clients and/or servers. Referring now to FIG. 3, there is shown a block diagram depicting an architecture for implementing at least a portion of a system for call recording on a distributed computing network, according to at least one embodiment.

The arrangement shown in FIG. 3, any number of clients 310 are provided; each client 310 may run software for implementing client-side portions of the present invention. In addition, any number of servers 320 can be provided for handling requests received from clients 310. Clients 310 and servers 320 can communicate with one another via electronic network 300, which may be in various embodiments any of the Internet, a wide area network, a mobile telephony network, a wireless network (such as WiFi, Wimax, and so forth), or a local area network (or indeed any network topology known in the art; the invention does not prefer any one network topology over any others). Network 300 may be implemented using any known network protocols, including for example wired and/or wireless protocols.

In addition, in some embodiment, servers 320 can call external services 330 when needed to obtain additional information, or to refer to additional data concerning a particular call. Communications with external services 330 can take place, for example, via network 300. In various embodiments, external services 330 include web-enabled services and/or functionality related to or installed on the hardware device itself. For example, in an embodiment where client application 200 is implemented on a smartphone or other electronic device, client application 200 can obtain information stored in a server system in the cloud or on an external service 230 deployed on one or more of a particular enterprise's or user's premises.

In various embodiments, functionality for implementing the techniques of the present invention can be distributed among any number of client and/or server components. For example, various software modules can be implemented for performing various functions in connection with the pre sent invention, and such modules can be variously implemented to run on server and/or client components.

Conceptual Architecture

Figure 4:
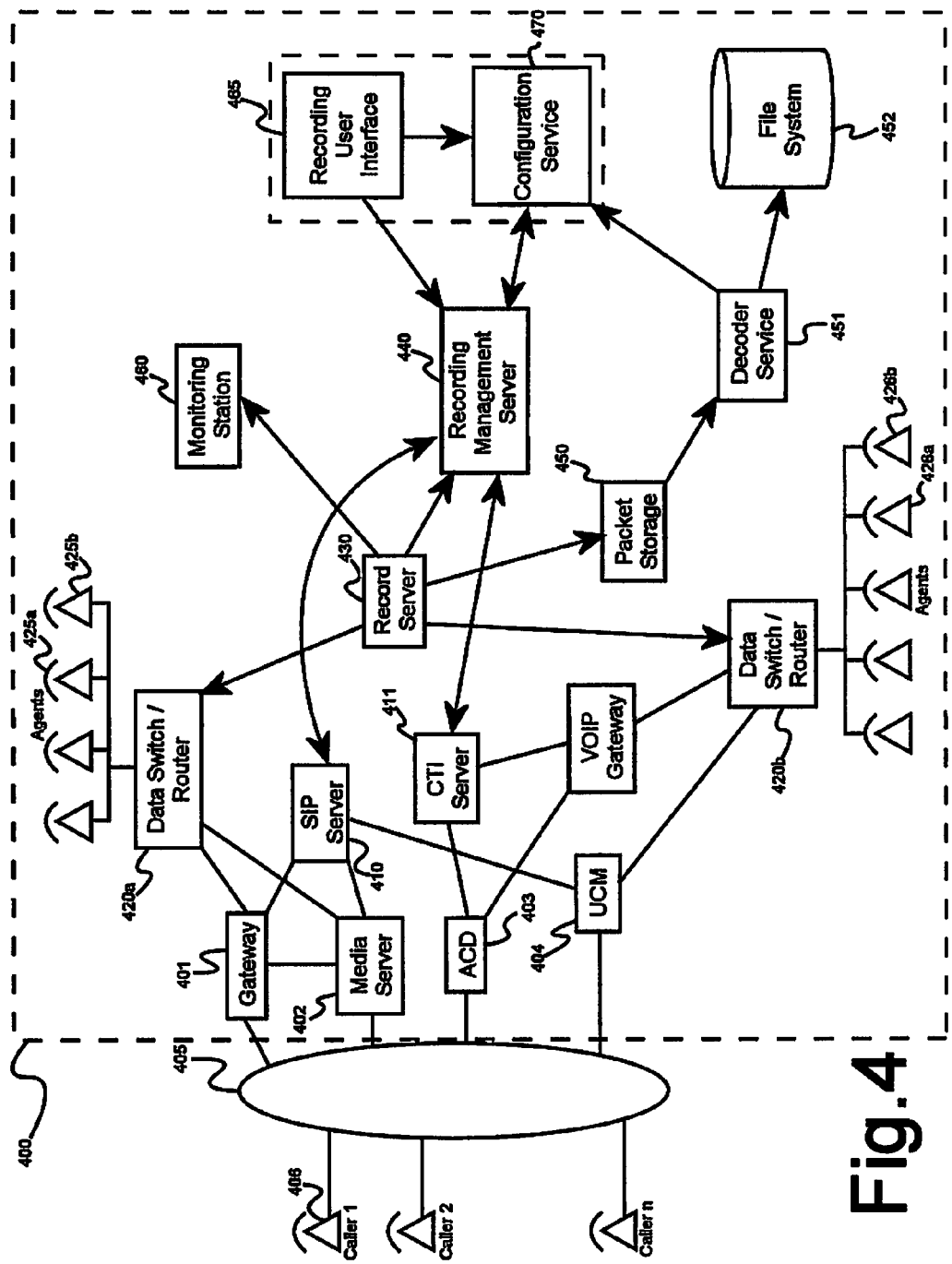
FIG. 4 is a block diagram of a preferred embodiment of the invention, illustrating conceptual architecture elements pertaining to the invention.

FIG. 4 provides a high-level diagram of a preferred embodiment of the invention, which will be useful for discussing aspects of the invention and improvements inherent in the invention over systems known in the art. According to the embodiment, communications in a contact center environment will be recorded for quality assurance in a customer service environment. FIG. 4 can also provide a high-level representation of a preferred embodiment for recording communications in a law-enforcement or an anti-terrorism environment.

Through human interaction, recording user interface 465 is used to identify communications (for example, communication packets with a particular source IP address, source port, destination address, destination port, or other identifying information) that are to be recorded (herein, referred to as a "recording target"), in communication environment 400. Recording user interface is also used to configure recording rules (for example, interaction types to record, communication station location to record, communication channel or channels to record, physical location of where the communications to record occur, MAC address of the communication device to record, etc.) for each recording target. Recording user interface 465 is also used to configure additional recording rules (for example, record all communications for a particular recording target or group of targets, record incoming communications only for a target or group of targets, record all communications based on a particular trigger for one or more recording targets, etc.), whether for the entire system, a subset of communications, or for individual recording targets in communication environment 400. Configuration data (for example, recording target and associated recording rules) is then stored in configuration service 470. For example, recording user interface 465 can configure the system so that recording management server 440 can record all communications for a recording target, such as, but not limited to communications via voice over IP (VoIP), instant messaging (IM), video conference, or a transition in availability presence for agent station 425*a*.

When a system according to the invention runs, an exemplary process commences with recording management server 440 requesting identification information (for example, source IP address, source port, destination IP address and destination port), for a first recording target from configuration service 470. Recording management server 440 then sends a command to record server 430 to create a hash key entry in a hash table, that may or may not link to a group of hash tables, designed to keep an entry of each source IP address, source port, destination IP address and destination port used to facilitate packet-based communication (herein referred to as "hash table one") for agent station 425*a* (i.e. a recording target) and caller 406. It will be appreciated by one having ordinary skill in the art that any of the many known hashing algorithms may be used to create hash tables and hash table entries. The system is now setup to record communications for the specific recording target, in this case, agent station 425*a*.

In another example, recording management server 440 requests identification information (for example, destination IP address and destination port), for a next recording target from configuration database 470. In this example, a destination IP address and destination port used to facilitate communication for agent station 425*b* (i.e. a recording target) is to be recorded. Recording management server 440 sends a command to record server 430 to create a hash key entry that corresponds to agent station 425*b*, in a second hash table designated for recording targets with only a destination IP address and destination port (herein referred to as "hash table two"). It will be appreciated by one having ordinary skill in the art that any of the many known hashing algorithms will be used to create hash tables and hash table entries. The system is now setup to record communications for a recording target, in this case, agent station 425*b*.

In another example, recording management server 440 requests identification information (for example, source IP address and source port), for a next recording target from configuration service 470. In this example, a source IP address and source port used to facilitate communication for agent station 425*b* (i.e. the recording target) is to be recorded. Recording management server 440 sends a command to record server 430 to create a hash key entry that corresponds to agent station 425*b*, in a second hash table designated for recording targets with only a source IP address and source port (herein referred to as "hash table three"). It will be appreciated by one having ordinary skill in the art that any of the many known hashing algorithms will be used to create hash tables and hash table entries. The system is now setup to record communications for a recording target, in this case, agent station 425*b*.

Once all desired recording targets are defined in the hash tables in record server 430 by recording management server 440, the system is setup and ready to record communications within communication environment 400.

Referring again to FIG. 4, when a request for communication (for example, a SIP request message requesting voice conversation), arrives at gateway 401, media server 402, or unified communication module (UCM) 404, in communication network 400 requesting communication with an agent in communication environment 400, the request is passed to SIP server 410. Once SIP server 410 identifies a target agent (for example, through a contact center agent selection function known in the art), SIP server 410 then sends a request to recording management server 440 to determine if the source and/or destination identification information, in this example source IP address and source port, is in hash table three (that is, the hash table defined earlier that identifies recording targets by source IP address and source port). Recording management server determines this via polling record server 430. If a matching entry is found, recording management server 440 accesses recording rules (for example, to record all voice conversations) associated to the specific recording target in configuration service 470. If recording rules match the details in the communication request, in this example requesting a voice conversation, then recording management server 440 sends a request to record server 430 to start capturing all voice packets (for example, as determined from the SIP message's session description protocol) from data switch/router 420*a* and/or data switch/router 420*b* with the recording target's source IP address and source port using standard packet capture such as PCAP, WinCAP, or another packet capture function available in the art, to packet storage 450. Decoder server 451 may in some cases recreate the communication stream and write it to file system 452. During a packet capture process, if recording user interface 465 requests recording management server 440 to monitor the recording target in real time, then a request is sent to record server 430 to also send a corresponding packet stream to monitor station 460 where the monitored communication packet stream can be reviewed. If the identifying information does not correspond to any entry in hash table three, or the recording target is not configured to record with the configured rules, for example, the specific media type outlined in the session description protocol, the packet is discarded. For all packets that arrive at gateway 401, media server 402, or UCM 404, the same request procedure to SIP server 410 and the sequence of actions on whether to store or discard the packet described in this paragraph, repeats. Note that record server 430 typically establishes a "sniffer" connection to one or more data switches or routers 420*a*, 420*b*, and receives packets from these network components in promiscuous mode, so that every packet that passes through switches and routers 420*a*, 420*b* (of course, there may be many of these; two are shown in FIG. 4 for clarity and simplicity, but any number may be so configured according to the invention). Thus record server 430 must be able to receive a large number of packets in a short time, and must be able to sort out the "wheat" (packets which should be retained as part of a requested recording) and the "chaff" (packets that are either not communications packets at all, or that are not subject to a recording request). This need to be able to receive a large number of packets and to rapidly discriminate those of interest highlights a principal object of the present invention. The use of hashtables and cyclic buffers as described herein is intended to enable a plurality of record servers 430 to receive high volumes of packets and to rapidly discriminate and capture those of interest without generating congestion or a backlog, and without losing packets of interest.

Referring again to FIG. 4, when a request for communication (for example, a telephone call) arrives at an automatic call distributor ACD 403 in communication network 400, requesting communication with an agent in communication environment 400, the request is passed to CTI server 411. Once CTI server 411 identifies the target agent (for example, through a contact center agent selection function known in the art), CTI server 410 sends a request to recording management server 440 to determine if the source and/or destination identification information, in this example destination IP address and destination port, is in hash table two (that is, the hash table defined earlier that identifies recording targets by destination IP address and destination port). Recording management server determines this via polling record server 430. If a matching entry is found, recording management server 440 accesses recording rules (for example, to record all inbound conversations) associated to the specific recording target in configuration service 470. Recording management server 440 sends a request to record server 430 to start capturing all voice packets from data switch/router 420b (for example, the packets resulting from the VoIP conversion from voice gateway 421 of the communication) with the recording target's destination IP address and destination port using standard packet capture such as PCAP, WinCAP, or another packet capture function available in the art, to packet storage 450. Decoder server 451 may optionally recreate the communication stream and write it to file system 452. During packet capture process, if recording user interface 465 requests recording management server 440 to monitor the recording target, then a request is sent to record server 430 to also send the corresponding packet to monitor station 460 where the communication packet stream can be reviewed. If the identifying information does not correspond to any entry in hash table two, the packet is discarded. For all packets that arrive at ACD 403, the same request procedure to CTI server 410 and the sequence of actions on whether to store or discard the packet described in this paragraph, repeats.

Through human interaction, a user can configure recording management server 440 to instruct recording management server 440 to direct packets of interest from record server 430 to decoder server 451 for immediate decoding and recreation of the communication stream for live monitoring. Depending on the type of communication that has been captured, the communication can be viewed (in the case of video or text communication) or heard (in the case of video or audio communication) or a combination of both (in the case of simultaneous communications streams; for example a simultaneous recording of IM and VoIP communications), through monitor station 460.

For all packets of interest stored in packet storage 450 using the exemplary techniques described above, decoder service 451 writes the packet information to file system 451 in a manner where the communication can be coherently reviewed by a human or an automated process.

Detailed Description of Exemplary Embodiments

Figure 5:
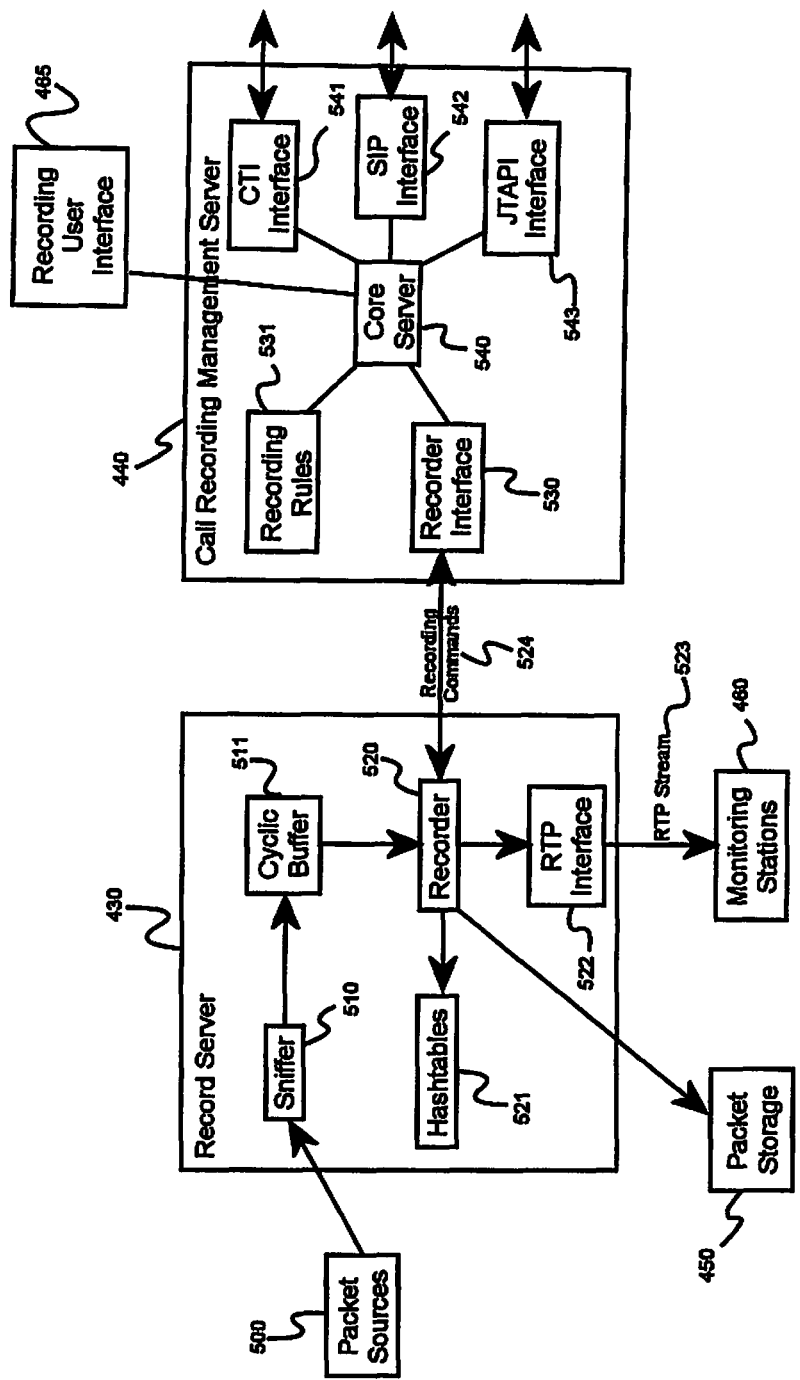
FIG. 5 is a block diagram showing details of call recording management and call recording servers, according to a preferred embodiment of the invention.

FIG. 5 is a block diagram showing details of call recording management and call recording servers, according to a preferred embodiment of the invention. Recording management server 440 is configured to select the communications that are to be recorded in communication environment 400. Core server 540 receives notification from CTI interface 541 that communications for a particular target (for example, all communication packets destined for a specific IP address and port from a specific source IP address and port) as selected by contact center agent selection function known in the art, are to be recorded (herein, referred to as "recording target"). Core server 540 then notifies recorder interface 530 to instruct record server 430 to record communications for the recording target. When recorder 520 receives the recording target's identification information, in this example, a destination IP address and port number, a hash key that corresponds to the identification information for this target, is created in a first hash table (herein, referred to as "hash table one") in hashtables 521.

In a similar process, Core server 540 receives a notification from SIP interface 542 that communications for a particular target (for example, all communication packets that arrive from a specific source IP address and port) as selected by contact center agent selection function known in the art, are to be recorded (herein, also referred to as "recording target"). Core server 540 then notifies recorder interface 530 to instruct record server 430 to record communications for the recording target. When recorder 520 receives the recording target's identification information, in this example a destination IP address and port number, a hash key that corresponds to the identification information for this target, is created in a second hash table (herein, referred to as "hash table two") in hashtables 521.

In a similar process, Core server 540 receives notification from JTAPI interface 543 that communications for a particular target (for example, all communication packets destined for a specific IP address and port) as selected by contact center agent selection function known in the art, are to be recorded (herein, also referred to as "recording target"). Core server 540 then notifies recorder interface 530 to instruct record server 430 to record communications for the recording target. When recorder 520 receives the recording target information, a hash key that corresponds to the identification information for this target, is created in a third hash table (herein, referred to as "hash table three") in hashtables 521.

Referring again to FIG. 5, in the typical operation of the system, packets will be moving through the system from a source to a destination. While in a network router, or other IP networking peripheral, the packets will arrive at packet source 500 (for example a SPAN port, IP tap, or another packet mirroring port known in the art). Sniffer 510 then captures the packets from packet source 500 and passes the packet to cyclic buffer 511. When a packet is received in cyclic buffer 511, recorder 520 is notified. Recorder 520 then analyzes the packet contents and compares the information to the hash tables in hashtables 521. If the identification information (for example, destination IP address, destination port, source IP address, and source port) match an entry in hash table one of hashtables 521 that corresponds to the identification information for this recording target, the system keeps the packet for further processing (herein, referred to as "packet of interest"). Otherwise, if the identification information of the packet does not correspond to any entries in hash table one of hashtables 521, a new set of identification information is set (for example, destination IP address and destination port) and compared to the entries in hash table two of hashtables 521. If the identification information (for example, destination IP address and destination port) match an entry in hash table two of hashtables 521 that corresponds to the identification information for this recording target, the system keeps the packet for further processing (herein, referred to as "packet of interest"). Otherwise, if the identification information of the packet does not correspond to any entries in hash table two of hashtables 521, a new set of identification information is set (for example, the source IP address and source port) and compared to the entries in hash table three of hashtables 521. If the identification information (for example, source IP address and source port) match an entry in hash table three of hashtables 521 that corresponds to the identification information for this recording target, the system keeps the packet for further processing (herein, referred to as "packet of interest"). Otherwise, if the identification information of the packet does not correspond to an entry in hash table three nor any of the other hash tables, the packet is discarded.

Once a packet of interest is identified in cyclic buffer 511 by recorder 520 as outlined above, the packet is copied to packet storage 450 using a standard packet capture library (for example, PCAP, WinCAP, or another packet capture function available in the art). If a request to monitor a recording target is requested by recording user interface 465, then core server 540 sends a request through recorder interface 530 to recorder 520 to pass all the corresponding packets of interest to RTP interface 522. RTP interface 522 forwards RTP stream 523 (that is, the payload component of an IP communication) to monitoring station 460 for the communication to be monitored.

Figure 6:
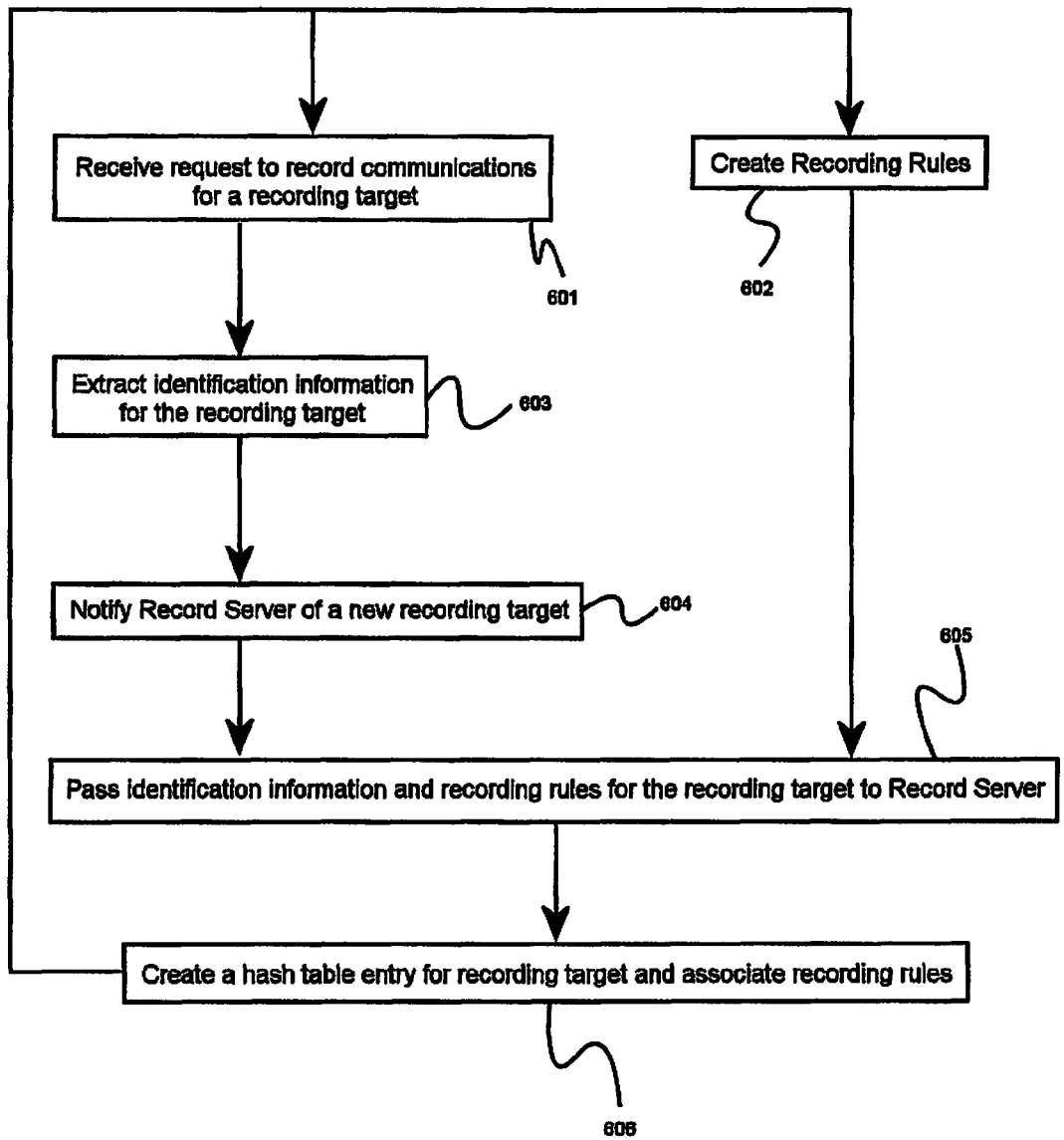
FIG. 6 is a process flow diagram illustrating a method of setting up a record server to record communications in a communications environment according to a preferred embodiment of the invention.

FIG. 6 is a process flow diagram illustrating a method of setting up a record server to record communications in a communications environment according to a preferred embodiment of the invention. In step 601, a request is sent to core server 540 by CTI interface 541, SIP interface 542, or JTAPI interface 543 that communications for a particular recording target is to be recorded. Step 602 defines the rules for the recordings, for example, a rule to record just the voice conversations for the recording target. In step 603, the information that identifies the recording target (for example, a destination IP address and port for the recording), is extracted from the request. In the next step 604, the record server 430 is notified that there is a request to record communications for a particular destination IP address and port. In step 605, the identification information and the recording rules that were created in step 602, are passed to the record server 430. Step 606 creates a hash table entry in hash table one of hashtables 521. The process begins again at step 601 for the nest request to record communications. In some embodiments, only one hash table may be used. It will be appreciated by one having ordinary skill in the art that any of the many known hashing algorithms may be used to create hash tables and hash table entries.

Figure 7:
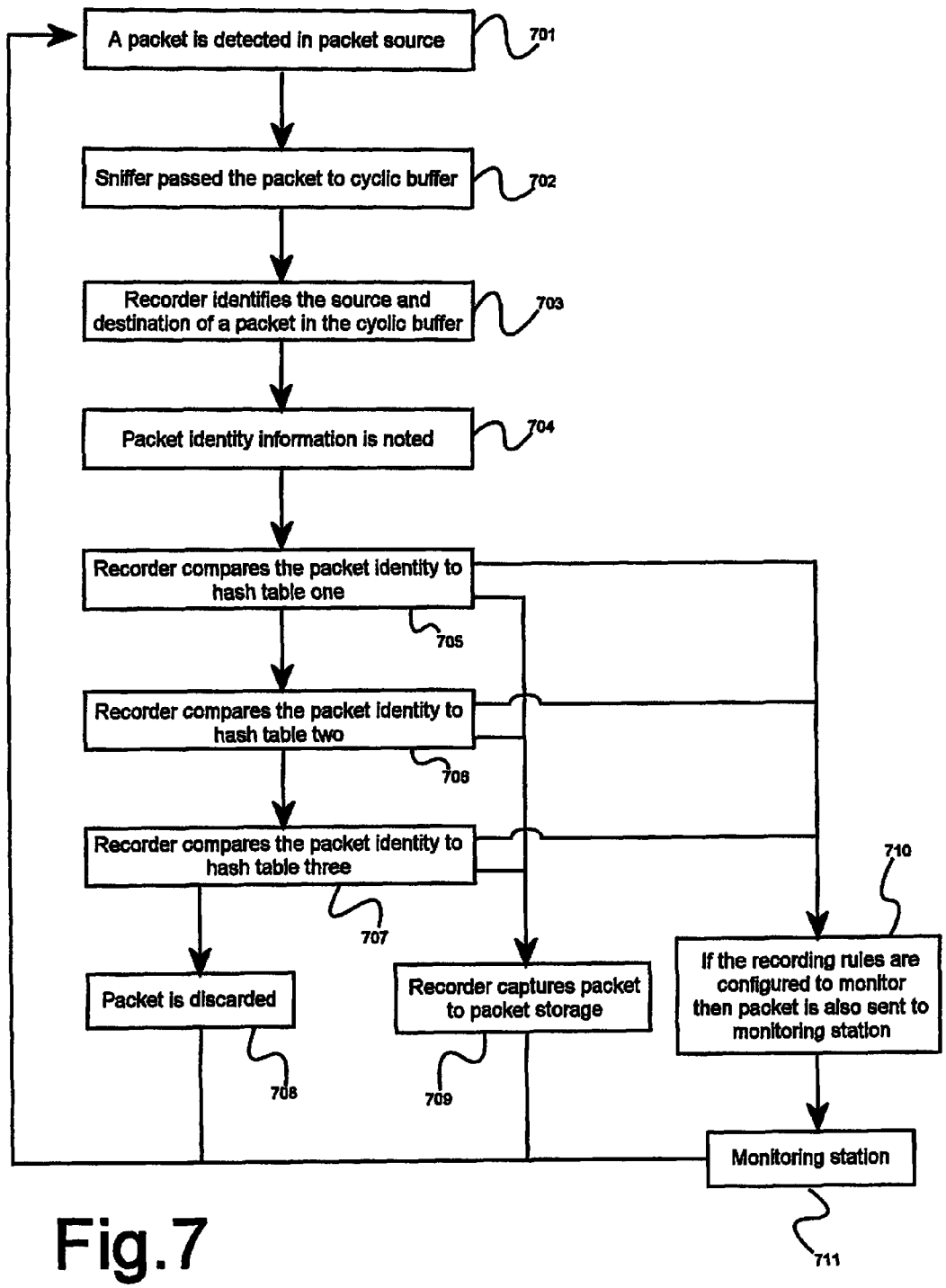
FIG. 7 is a process flow diagram illustrating a method of passively recording communications in a communication center environment, according to a preferred embodiment of the invention.

FIG. 7 is a process flow diagram illustrating a method of passively recording communications in a communication center environment, according to a preferred embodiment of the invention. In step 701, a packet is detected in packet source 501. In step 702, sniffer 510 passes the packet to cyclic buffer 511. In step 703, recorder 520 reads the packet and identifies the source and destination (for example destination IP address, destination port, source IP address, and source port). It is noted for further processing in step 704. In step 705, the recorder compares the source and destination information, in this example, source IP address, source port, destination IP address and destination port, to hash table one in hashtables 521. If the packet identity information in the packet, again in this example, source IP address, source port, destination IP address and destination port, corresponds to an entry in hash table one of hashtables 521, then in step 709 recorder 520 captures the packet and passes it to packet storage 450 using a standard packet capture function (for example, PCAP, WinCAP, or another packet capture function) available in the art, and the process begins again at step 701. Step 710 checks for a request to forward the conversation to monitoring station 460. If a request is found, record server 430 forwards RTP stream 523 to monitoring station 460 in step 711. In some embodiments, only one hash table may be used where iteration through the hash table is performed to determine whether or not the acquired packet is to be stored. When a positive match is found, the packet is written to a file related to the hash table entry. The iteration goes through the entire hash table to satisfy all potential recording requirements (for example, record the conversation, forward the RTP stream, etc.)

If the packet identity information in the packet from step 704 does not correspond to an entry in hash table one of hashtables 521, then another hash table comparison happens in step 706. In step 706, a subset of the identity information obtained in step 704 in this example, destination IP address and destination port, is compared to hash table two of hashtables 521. If the packet identity information in the packet, again in this example, destination IP address and destination port, corresponds to an entry in hash table two of hashtables 521, recorder 520 captures the packet and passes it to packet storage 450 using a standard packet capture function (for example, PCAP, WinCAP, or another packet capture function) available in the art, and the process begins again at step 701. Step 710 checks to see if the recording rules are configured to monitor communications for the recording target. If so, in step 711, the packet is also passed to monitoring station 460.

If the packet identity information in the packet from step 704 does not correspond to an entry in hash table two of hashtables 521, then another hash table comparison happens in step 707. In step 707, a subset of the identity information obtained in step 704, in this example, source IP address and source port, is compared to hash table three of hashtables 521. If the packet identity information in the packet, again in this example, source IP address and source port, corresponds to an entry in hash table two of hashtables 521, recorder 520 captures the packet and passes it to packet storage 450 using a standard packet capture function (for example, PCAP, WinCAP, or another packet capture function) available in the art, and the process begins again at step 701. Step 710 checks to see if recording rules 531 are configured to monitor communications for the recording target. If so, in step 711, the packet is also passed to monitoring station 460.

If the packet identity information in the packet from step 704 does not correspond to an entry in hash table one of hashtables 521 that corresponds to the identification information for the recording target, then the packet is discarded and the process begins again in step 701.

As outlined earlier, there are several types of events that can trigger communications recording in communication environment 400. The following table is an example describing events that can take place in communication environment 400 that can trigger communication recording:

TABLE 1

Example communication types.

| Type | Details | Packet capture | Monitoring |
|---|---|---|---|
| Voice over IP | Packet switched audio conversations in a communication center environment | Packets of interest are captured and assembled in a fashion that can be reviewed at a later time | The real-time stream is recreated and sent to a monitoring station for active listening |
| Video over IP | Packet switched video conversations in a communication | Packets of interest are captured and assembled in a fashion that can be | The real-time stream is recreated and sent to a monitoring station for active |

TABLE 1-continued

Example communication types.

| Type | Details | Packet capture | Monitoring |
| --- | --- | --- | --- |
| | center environment | reviewed at a later time | viewing and listening |
| Instant Messaging | Packet switched text conversations in a communication center environment | Packets of interest are captured and assembled in a fashion that can be reviewed at a later time | The text stream is recreated and sent to a monitoring station for active viewing |
| Availability Presence or transitions in availability presence | Changes in availability in a communication center environment | Availability notification packets of interest are captured with timeline information and assembled in a fashion that can be recreated at a later time | Availability notification packets are sent in real-time to a monitoring station |

Figure 8:
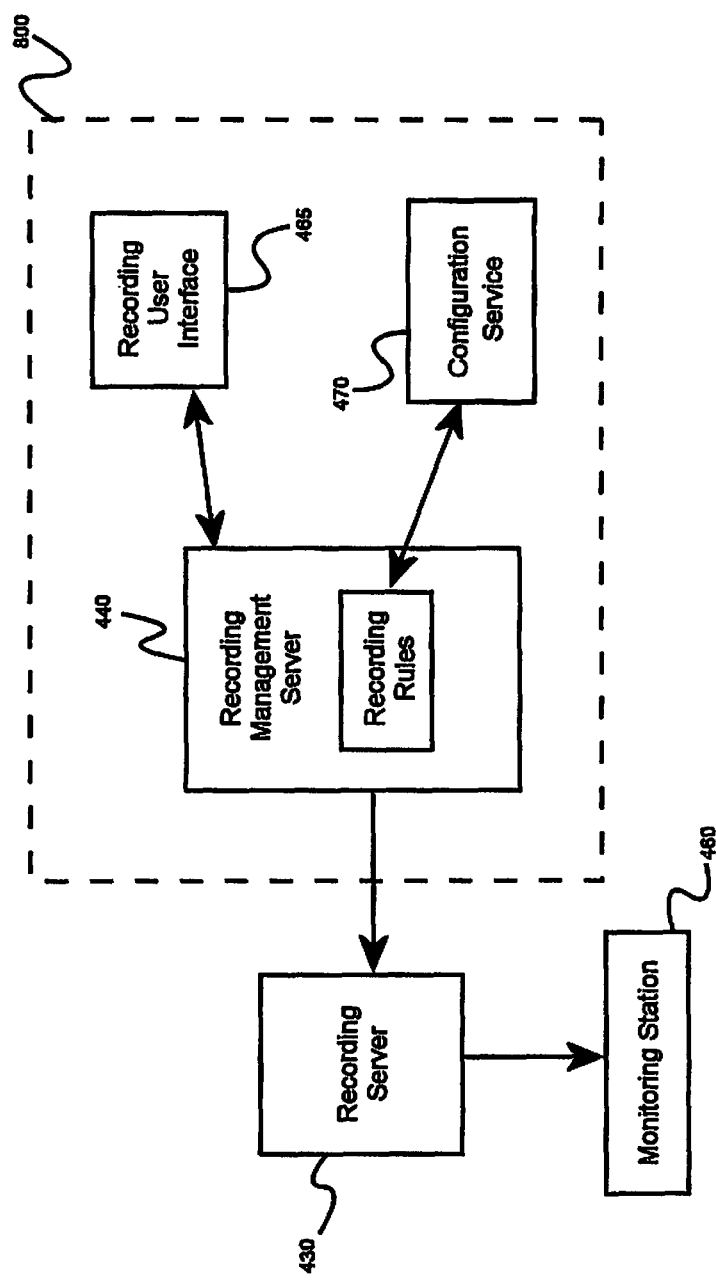
FIG. 8 is a block diagram illustrating a method of passively monitoring communications by communication type, according to a preferred embodiment of the invention.

A key point of Table 1 is that communications that would typically be recorded in a communication network would include different communication types across different communication mediums (for example, voice over IP, video conferencing, instant messaging, availability presence, etc.). An exemplary process where a communication type to record is chosen as a configuration element for a recording target is illustrated by FIG. 8, which is a subset of the components from FIG. 4 and FIG. 5. For example, in FIG. 8, recording management environment 800 is used to set one or more communication types (for example, the communication types listed in Table 1) that are to be recorded for a recording target. The option for a recording target may include, but are not limited to, recording of voice communications via VoIP, video communications over IP, text-based conversations via instant messaging, changes in availability presence, or a combination of one or more communication types outlined in Table 1, or any other electronic, packet-based communications types known in the art. For example, through human interaction, or through an automated process, recording user interface 465 is used to set an option to capture communication packets of all communication types in Table 1 for recording target 425a. In this case, when packets destined for 425a are identified in data switch/router 420a by recording server 430 as outlined previously, all communication types (for example VoIP conversation, video conferencing, instant messaging, and transitions in availability presence) that are passed through communication environment 400 destined for 425a are captured by recording server 430 and stored in packet storage 450. In the case of a request to monitor communications, the communication packets are also sent to monitoring station 460 for review.

Referring again to FIG. 8, through human interaction, or some automated process, recording user interface 465 is used to configure a system according to the invention to capture communication packets of a communication type of instant messaging for recording target 425b. In this case, when packets destined for 425b are identified in data switch/router 420a by recording server 430 as outlined previously, only the communication packets having instant message type communication (for example, a packet type as defined by a session description protocol known in the art), that originate or are destined for recording target 425b are captured by recording server 430 and stored in packet storage 450. In the case of a request to monitor communications, the communication packets are also sent to monitoring station 460 for review.

Referring again to FIG. 8, through human interaction, or some automated process, recording user interface 465 is used to configure to capture communication packets that have availability presence information for recording target 425b. In this case, when packets originating from or destined for 425b are identified in data switch/router 420a by recording server 430 as outlined previously in this document, only the packets with availability information corresponding to target 425b (for example, definition of an event package within the general SIP event notification framework known in the art), that are detected for recording target 425b are captured by recording server 430 and stored in packet storage 450. In this case, recording server 430 adds time code information so that availability can be recreated by time sequence. If a request to monitor communications is received by recording server 430, the packets are also sent to monitoring station 460 for review. In some embodiments, when monitoring of call is happening, the RTP stream is sent via a RPT proxy (not shown) in call recording management server 440.

Some embodiments of the invention also include an ability to automatically trigger different recording targets or the addition of communication types to record by, but not limited to, the events outlined in the table below:

TABLE 2

Communication recording triggers.

| Event | Details | Packet capture | Monitoring |
| --- | --- | --- | --- |
| System configuration | Through human interaction via recording user interface 465, the system will be configured to capture one or more communication types (for example, voice over IP, video conferencing, instant messaging, availability presence, etc.) for the recording target. | All packets for the configured communication types are captured that can be reviewed at a later time. | All packets for the configured communication types are sent in real-time to a monitoring station in a fashion that can be reviewed immediately. |
| Word spotting | A recording target or specific conversation will be added to the recording target list when a pre-configured word or phrase is detected through automatic speech recognition. | All packets for the recording target or conversation will be captured so that it can be reviewed at a later time. | All packets for the configured communication types are sent in real-time to a monitoring station in a fashion that can be reviewed immediately. |

TABLE 2-continued

Communication recording triggers.

| Event | Details | Packet capture | Monitoring |
|---|---|---|---|
| Mood detection | A recording target or specific conversation will be added to the recording target list when a specific mood is detected through using the acoustical elements of the voice in an audio conversation, facial expression recognition through video recognition in a video conversation, or context based emotion detection from text input in an IM conversation. | All packets for the recording target or conversation will be captured so that it can be reviewed at a later time. | All packets for the configured communication types are sent in real-time to a monitoring station in a fashion that can be reviewed immediately. |
| Social network connection | A recording target or specific conversation will be added to the recording target list when a specific connection, as determined by a social connection, is detected through using integration to popular social media networks such as, Facebook, Twitter, LinkedIn, or another social network known in the art. | All packets for the recording target or conversation will be captured so that it can be reviewed at a later time. | All packets for the configured communication types are sent in real-time to a monitoring station in a fashion that can be reviewed immediately. |

A key point of Table 2 is that communications packets to be captured in a communication network can be pre-configured through human interaction, by an automated process, or triggered automatically by specific events in the communication environment. For example, the events outlined in Table 2 outline an exemplary set of events that may trigger addition of a recording target or addition of a type of communication packets to capture based on communication types outlined in Table 1.

Figure 9:
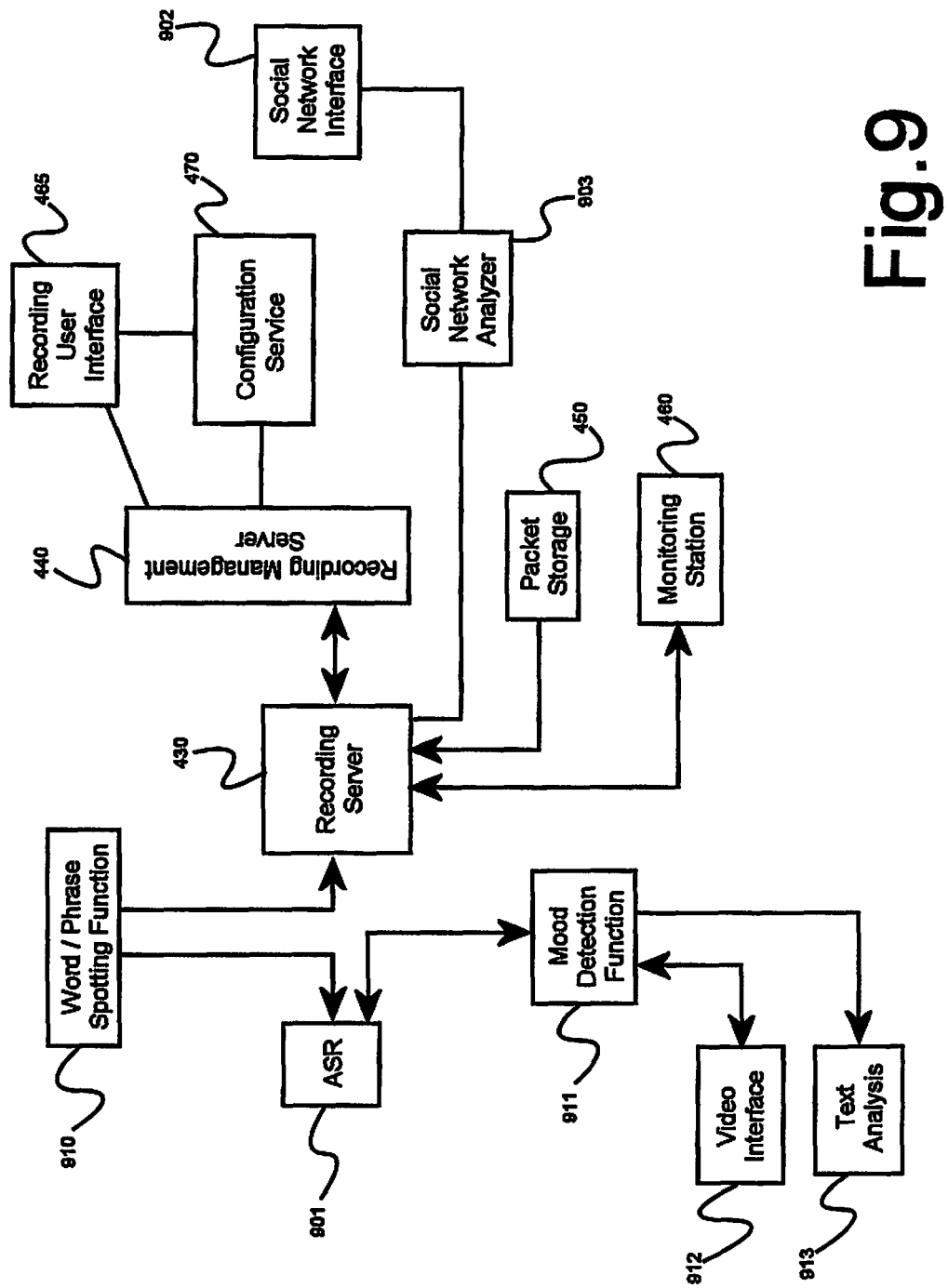
FIG. 9 is a block diagram illustrating a method of passively monitoring communications based on event triggers, according to a preferred embodiment of the invention.

Referring now to FIG. 9, recording user interface 465 creates a configuration in configuration service 470 to record all communication packets with a particular phrase (for example, in an anti-terrorism application, a phrase such as "we will bomb", herein referred to as a "phrase of interest") in a communication environment. Recording user interface 465 saves one or more phrases of interest in configuration service 470.

Referring again to FIG. 9, when word/phrase spotting function 910 recognizes and processes speech data recognized by automatic speech recognition function ASR 901, the words and phrases are compared by recording server 430 to phrases of interest configured in configuration service 470. If there is a match, the identification information (for example source IP address, source port, destination IP address, destination port, unique header, attached data, other identifying information, or a combination of some or all of these) of the communication packets, is added as a recording target to configuration service 470 and all future communication packets for recording target will be captured to packet storage 450 using the process outlined earlier in the invention.

In another example, recording user interface 465 creates a configuration in configuration service 470 to record all voice communications that are deemed to be conducted in an angry fashion (for example, an elevated voice pattern typical with people who may be angry) in a communication environment. Recording user interface 465 saves the mood categorization configuration (herein, referred to as "mood of interest") in configuration service 470.

Referring again to FIG. 9, when mood detection function 911 recognizes and processing speech data recognized by automatic speech recognition function ASR 901, and mood detection function 911 determines that the conversation may have acoustical patterns that are categorized as angry; the categorization is compared by recording server 430 to the entries corresponding to the moods of interest in configuration service 470. It will be appreciated by one having ordinary skill in the art that any of the many mood detection algorithms will be used to identify the mood detection by mood detection function 911. If there is a match, the identification information (for example source IP address, source port, destination IP address, destination port, unique header, attached data, other identifying information, or a combination of some or all of these) of the communication packets, is added as a recording target to configuration service 470 and all future communication packets for this recording target will be captured to packet storage 450 using the process outlined earlier in the invention.

In another example, recording user interface 465 creates a configuration in configuration service 470 to record all video communications that are deemed to be conducted in an angry fashion (for example, a physical manifestation of facial expressions typically associated to a person who may be angry) in a communication environment. Recording user interface 465 saves the mood categorization configuration (herein, referred to as "mood of interest") in configuration service 470.

Referring again to FIG. 9, when mood detection function 911 recognizes and processes facial video data recognized by video interface 912, and determines that the conversation may have facial recognition patterns that are categorized as angry; the categorization is compared by recording server 430 to the entries corresponding to the moods of interest in configuration service 470. It will be appreciated by one having ordinary skill in the art that any of the many facial recognition pattern detection algorithms will be used to identify facial characteristics by video interface 912 and the associated mood categorized by mood detection function 911. If there is a match, the identification information (for example source IP address, source port, destination IP address, destination port, unique header, attached data, other identifying information, or a combination of some or all of these) of the communication packets, is added as a recording target to configuration service 470 and all future communication packets for this recording target will be captured to packet storage 450 using the process outlined earlier in the invention.

In another example, recording user interface 465 creates a configuration in configuration service 470 to record all textual communications that are deemed to be conducted in an angry fashion (for example, the use of profanity or strong and unpleasant language in an instant message conversation) in a communication environment. Recording user interface 465 saves the mood categorization configuration (herein, referred to as "mood of interest") in configuration service 470.

Referring again to FIG. 9, when mood detection function 911 recognizes and processing textual data packets recognized by text analysis 913, and determines, using mood detection function 911 that the conversation may have text that is categorized as angry; the categorization is compared, by recording server 430, to the entries corresponding to the moods of interest in configuration service 470. It will be appreciated by one having ordinary skill in the art that any of the many textual sentiment analysis algorithms will be used to identify and categorize the mood-by-mood detection function 911. If there is a match, the identification information (for example, source IP address, source port, destination IP address, destination port, unique header, attached data, other identifying information, or a combination of some or all of these) of the communication packets, is added as a recording target to configuration service 470 and all future communication packets for this recording target will be captured to packet storage 450 using the process outlined earlier in the invention.

In another example, recording user interface 465 creates a configuration in configuration service 470 to add recording targets based on social network connections (for example, a recording target has a social connection in Twitter, a popular social network known in the art) in a communication environment. Recording user interface 465 requests recording server 430, through recording management server 440, to analyze the social network of the recording target using social network analyzer 903 by interfacing to Twitter using social network interface 902 to find a person with whom the recording target communicate frequently (herein, referred to as "additional recording target"). Once the social connection is identified, the identification information (for example, source IP address, source port, destination IP address, destination port, unique header, attached data, other identifying information, or a combination of some or all of these) for the additional recording target, is passed to recording server 430 and the identification information for the additional recording target is written to configuration service 470.

Referring again to FIG. 9, recording server 430 identifies and captures communication packets for the additional recording targets, in the same fashion as for recording targets described throughout this invention, to packet storage 450 using the process outlined earlier in the invention.

Figure 10:
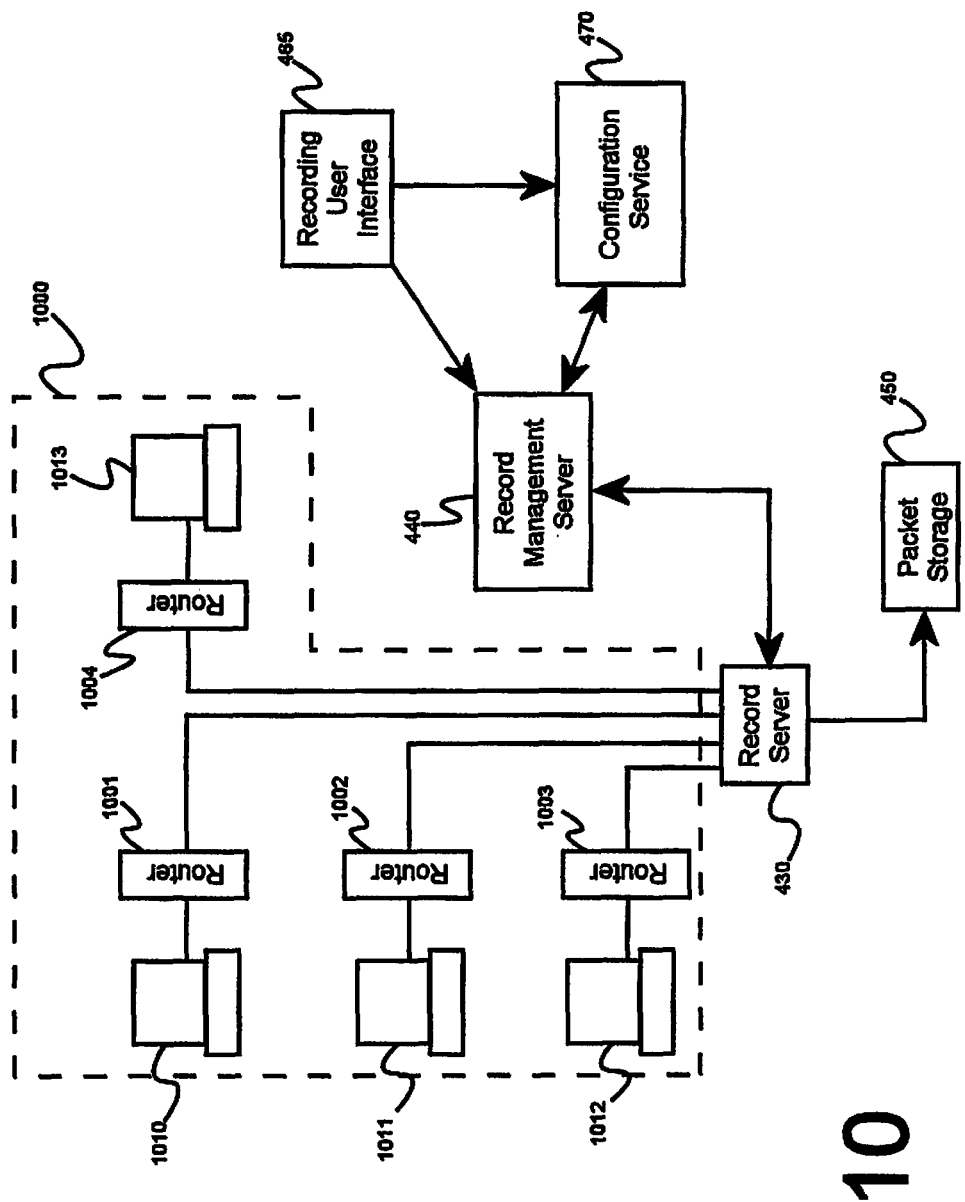
FIG. 10 is a block diagram illustrating a method of passively monitoring simultaneous communications, according to a preferred embodiment of the invention.

FIG. 10 is a block diagram illustrating a method of passively monitoring simultaneous communications, according to a preferred embodiment of the invention. In this example, recording user interface 465 creates a configuration in configuration service 470 to record all simultaneous communications of all communication types outlined in Table 1 for a recording target who communicates using end point 1013.

When communications are detected in communication environment 1000, recording server 430 requests instructions from recording management server 440 to determine which recording targets for which to capture communication packets. In this example, endpoint 1013 is a recording target. When endpoint 1010 starts communication via VoIP to endpoint 1013. Since endpoint 1013 is a pre-configured recording target, record server 430 captures VoIP communication packets from router 1004 for endpoint 1013 to packet storage 450. While endpoint 1013 and endpoint 1010 are communicating, endpoint 1013 begins an instant message conversation with endpoint 1012. Since the recording target, endpoint 1013, has been configured, in a previous step, to capture all simultaneous conversations, recording server 430 will also capture the IM conversation packets between endpoint 1013 and endpoint 1012 from router 1003 to packet storage 450 in addition to capturing the VoIP conversation packets between endpoint 1013 and endpoint 1010 from router 1004 to packet storage 450. In a similar fashion, endpoint 1010 starts an instant messaging conversation with endpoint 1011 while still communicating to endpoint 1013. Since recording target endpoint 1013, has been configured, in a previous step, to capture all simultaneous conversations, endpoint 1010 is deemed part of the simultaneous communication; the communication packets of the IM conversation between endpoint 1010 and endpoint 1011 is also captured by record server 430 from router 1001 to packet storage 450. In a preferred embodiment of the invention the system may or may not continue to record any leg of conversation outlined here, even if the VoIP conversation between endpoint 1010 and endpoint 1013 is terminated.

What is claimed is:

1. A system for passive communication recording, the system comprising:
    a plurality of record servers each operating on a network-attached computer and comprising a packet sniffer, a cyclic buffer, a recorder software module, and a local packet storage; and
    a recording management server operating on a network-attached computer and comprising a plurality of recording rules stored in memory and a core server software module;
    wherein, upon receiving a recording request for a specific communication between two specific endpoints, the recording management server extracts identification information pertaining to at least a target of the recording request, generates a plurality of recording rules based at least on the recording request, and sends target information and the plurality of recording rules to a first record server capable of intercepting packets arriving at or sent from the target;
    wherein the first record server, upon receiving target information and the plurality of recording rules, creates a hashtable entry for the target and associates the hashtable entry with the plurality of recording rules;
    wherein, on detecting a new data packet from a network-attached packet source, the packet sniffer passes the new packet to the cyclic buffer;
    wherein the recorder software module retrieves a data packet from the cyclic buffer, identifies one or more of a source and a destination of the retrieved data packet, determines if a hashtable entry exists that corresponds to the retrieved data packet based on the source, the destination, or both, and if a corresponding hashtable entry exists and any recording rules associated with the corresponding hashtable entry are satisfied, the recorder software module sends the retrieved data packet to the local packet storage; and
    wherein packets obtained from at least two distinct packet sources are combined into a single recording of a communication session.

2. The system of claim 1, further comprising a monitoring station coupled via a data network to at least one record server, wherein when the recorder software module sends the retrieved data packet to the local packet storage, if a specific recording rule requires live monitoring of a communication or target associated with the second data packet, the retrieved data packet is also sent via a real-time part interface to a monitoring station.

3. The system of claim 1, further comprising an automated speech recognition server coupled to a record server, wherein a first rule is applied by the automated speech recognition server to determine whether a specific communication should be recorded.

4. The system of claim 3, wherein the first rule uses either a word spotting function or a mood detection function, or both.

5. A method for passive communication recording, the method comprising the steps of:
- (a) receiving, at a recording management server operating on a network-attached computer, a recording request for a specific communication between two specific endpoints;
- (b) extracting identification information pertaining to at least a target of the recording request;
- (c) generating a plurality of recording rules based at least on the recording request;
- (d) sending target information and the plurality of recording rules to a first record server capable of intercepting packets arriving at or sent from the target and operating on a network-attached computer and comprising a packet sniffer, a cyclic buffer, a recorder software module, and a local packet storage;
- (e) creating, at the first record server, a hashtable entry for the target;
- (f) associating the hashtable entry with the plurality of recording rules;
- (g) detecting, at the packet sniffer, a new data packet from a network-attached packet source;
- (h) passing the new packet from the packet sniffer to the cyclic buffer;
- (i) retrieving, using the recorder software module, a data packet from the cyclic buffer;
- (j) determining if a hashtable entry exists that corresponds to the retrieved data packet based on the source, the destination, or both;
- (k) if a corresponding hashtable entry exists and any recording rules associated with the corresponding hashtable entry are satisfied, sending, using the recorder software module, the retrieved data packet to the local packet storage; and
- (l) combining packets obtained from at least two distinct packet sources into a single recording of a communication session.

6. The method of claim 5, further comprising the step of:
- (l) sending the retrieved data packet via a real-time part interface to a monitoring station coupled via a data network to at least one record server, if a specific recording rule requires live monitoring of a communication or target associated with the retrieved data packet.

7. The method of claim 5, wherein a first rule is applied by an automated speech recognition server coupled to a record server to determine whether a specific communication should be recorded.

8. The method of claim 7, wherein the first rule uses either a word spotting function or a mood detection function, or both.

* * * * *